US007714989B1

(12) United States Patent
Freeman et al.

(10) Patent No.: US 7,714,989 B1
(45) Date of Patent: May 11, 2010

(54) MICROPULSE LASER GUIDANCE

(75) Inventors: Bryan J. Freeman, Fredericksburg, VA (US); Kenneth R. Nichols, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 38 days.

(21) Appl. No.: 12/315,490

(22) Filed: Nov. 25, 2008

Related U.S. Application Data

(60) Provisional application No. 61/005,118, filed on Nov. 28, 2007.

(51) Int. Cl.
*G01C 3/08* (2006.01)

(52) U.S. Cl. ...................................... 356/4.01; 356/29

(58) Field of Classification Search ................ 356/4.01, 356/28, 28.5, 29
See application file for complete search history.

(56) References Cited

U.S. PATENT DOCUMENTS

| 4,089,001 | A | * | 5/1978 | Donahue | .................... | 342/160 |
| 5,664,741 | A | | 9/1997 | Duke | ........................ | 244/3.11 |
| 5,950,115 | A | * | 9/1999 | Momtaz et al. | .............. | 455/73 |
| 5,987,078 | A | * | 11/1999 | Kiyanagi et al. | ............ | 375/344 |
| 6,260,792 | B1 | | 7/2001 | Zwirn et al. | ............... | 244/3.13 |
| 6,357,694 | B1 | | 3/2002 | Adda | ........................ | 244/3.13 |
| 6,898,218 | B2 | | 5/2005 | McCarthy | .................... | 372/21 |
| 6,926,227 | B1 | | 8/2005 | Young et al. | ................ | 244/3.13 |
| 2005/0156780 | A1 | * | 7/2005 | Bonthron et al. | ............ | 342/107 |

* cited by examiner

*Primary Examiner*—Isam Alsomiri
(74) *Attorney, Agent, or Firm*—Gerhard W. Thielman, Esq.

(57) ABSTRACT

A laser tracking processor is provided for integrating measured target-reflection signals used in directional control. The integration is performed to distinguish pulses reflected from the target against a noise background. The processor includes an optical detector, an accumulator, a correlator, a phase-lock loop and an integrator array. The optical detector receives the measured signals distributed among several guidance channels. The accumulator sums the measured signals as a combined signal for all the channels. The correlator temporally identifies an event that occurs to indicate a target-reflection pulse within the combined signal. The phase-lock loop synchronizes the event with a clock reference to produce a pulse window within which to search the combined signal for the pulses. The integrator array superimposes the measured signals within the pulse window for each channel to produce channel-specific integrated pulse signals. The processor can further include a sum integrator, a noise comparator and a reset trigger. The sum integrator superimposes a temporal sequence of combined signals from the accumulator as sum integration signals. The noise comparator determines whether the sum integrated signals exceed a noise threshold to set a detection satisfaction condition. The reset trigger initializes the temporal sequence of the integrator array and the sum integrator in response to the detection satisfaction condition, so that as the processor approaches the target, the guidance system can receive updates from the measured signals after becoming distinguishable above the noise.

5 Claims, 4 Drawing Sheets

MICROPULSE LASER GUIDANCE

CROSS REFERENCE TO RELATED APPLICATION

Pursuant to 35 U.S.C. §119, the benefit of priority from provisional application 61/005,118, with a filing date of Nov. 28, 2007, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to pulse laser tracking. In particular, this invention provides signal integration to distinguish a weak measured pulse reflected from a target against strong background noise.

A missile or projectile aimed at a target may include a targeting laser designator and a detector to receive reflected laser energy from the target. That reflection may be used to provide course correction information for terminal guidance to the target.

Historically, the development of laser guided weapons began in the early 1960s. Two methods of missile guidance included a beam-rider that follows the laser beam to the target and semi-active guidance that directs to the reflected energy off the target. Semi-active guidance was and remains preferred over the beam-rider due to the former's advantage in releasing the weapon from a location beyond the target's line-of-sight.

Initially, guidance processors for laser guidance weapons used analog electronics. Inertial sensors were bulky and expensive and thus not employed for these purposes. Even had inertial sensors been available, the computations involved in strap-down guidance would have been impossible in the volume and weight constraints available in a missile or bomb. With the advent of expendable, miniature and powerful processors, as well as inexpensive tactical-grade sensors, guidance algorithms can be much more capable and robust. Some guided weapons use the Global Positioning System (GPS) for positional updates at a one-second rate.

Over the past several years, the armed services have indicated a desire to replace the wavelength used by laser-guided weapons from the non-eye-safe 1.06 μm (1060 nm) near-infrared wavelength to the eye-safe 1.54 μm (1540 nm) mid-infrared eye-safe wavelength. The longer wavelength has the additional advantages of (a) corresponding to less atmospheric attenuation, and (b) greater sensitivity for its detectors. Despite these advantages, converting to the longer wavelength has encountered opposition because of sunk costs associated with the existing designators and munitions that employ the shorter wavelength. The anticipated cost of replacing both munitions and designators is considered prohibitive, thereby rendering equipment conversion impractical under conventional circumstances.

SUMMARY

Conventional laser pulse tracking processors yield disadvantages addressed by various exemplary embodiments of the present invention. In particular, various exemplary embodiments provide a laser tracking processor for integrating measured target-reflection signals used in directional control. The integration is performed to distinguish pulses reflected from the target against a severe noise background. The processor includes an optical detector, an accumulator, a correlator, a phase-lock loop and an integrator array. The optical detector receives the measured signals distributed among several guidance channels. The accumulator sums the measured signals as a combined signal for all the channels. The correlator temporally identifies an event that occurs to indicate a target-reflection pulse within the combined signal. The phase-lock loop synchronizes the event with a clock reference to produce a pulse window within which to search the combined signal for the pulses. The integrator array superimposes the measured signals within the pulse window for each channel to produce channel-specific integrated pulse signals.

In alternate embodiments, the processor can also include a sum integrator, a noise comparator and a reset trigger. The sum integrator super-imposes a temporal sequence of combined signals from the accumulator as sum integration signals. The noise comparator determines whether the sum integrated signals exceed a noise threshold to set a detection satisfaction condition. The reset trigger initializes the temporal sequence of the integrator array and the sum integrator in response to the detection satisfaction condition, so that as the processor approaches the target, the guidance system can receive updates from the measured signals after becoming distinguishable above the noise.

In various exemplary embodiments, the comparator further includes a phase selector, a plurality of integrators, a corresponding plurality of thresholds, and a logic gate. The phase selector sequences a plurality of phases within said combined signal, each phase of said plurality of phases representing a finite temporal period. The integrators, corresponding respectively to the phases, superimposes said combined signal within each respective phase as an integrated phase signal. The thresholds compare said integrated phase signal against a phase threshold to determine a phase satisfaction condition. The logic gate indicates a threshold-satisfying phase among the phases in response to at least one phase satisfaction condition.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
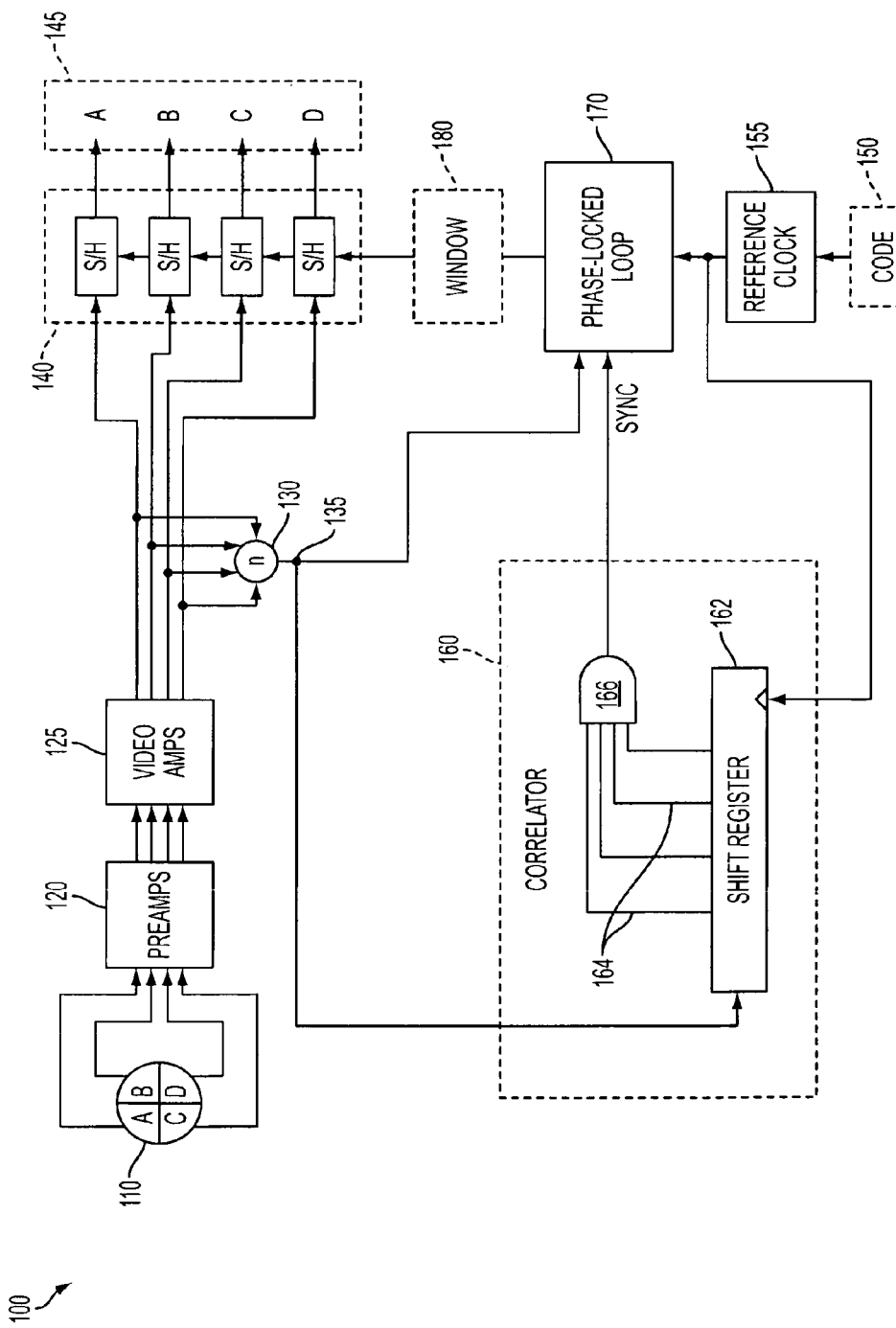
FIG. 1 is a block diagram view of a related or conventional laser tracking processor.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Conventional laser designators are large, heavy, and consume considerable electrical power. Large power consumption necessitates large batteries (at significant weight penalty) and thermal management in the designator to dispose of the wasted energy (because lasers are generally only ≦10% efficient). Because these designators are hand-carried by soldiers and marines, any additional weight constitutes a burden, for which to seek reductions. Previous efforts to obtain relief have concentrated on designing more efficient designators.

Two factors drive the power output required by a designator. First, the power in a single pulse must be sufficient to provide an adequate acquisition range to guide a missile to the target. Conventional designators output pulses in the 0.05 J to 0.10 J range and thus satisfy this requirement. Second, the data pulse rate must be sufficient to provide stable guidance with a minimal miss distance. Because laser system guidance is based on the angular error to the target, the rate of change of this angle increases as the missile closes range upon approach to the target.

Generally, a higher data rate is desirable during terminal guidance. Changing the pulse rate of the designator from the conventional approximate 20 Hz rate to an exemplary pulse rate of around 2 Hz can reduce the power requirement of the designator by an order of magnitude (i.e., factor of ten). This order of power savings greatly exceeds that available by more efficient lasers or switching to a more efficient wavelength. The benefit from replacing conventional laser designators with devices that employ much less power provides advantages that can justify contemporaneous switching from the non-eye-safe 1.06 μm wavelength to the 1.54 μm eye-safe wavelength for the seeker.

Conventional laser designators include the following characteristic disadvantages: (a) bulky (voluminous) and massive (heavy) with high power requirements, (b) not eye safe, (c) easily detectable by the target due to the high power illumination, (d) reveal location of the designator (tracing back to the illumination source), (e) can be counter-measured by jamming, (f) have limited availability as an asset due to high relative cost.

The cost and weight of conventional designators can be acceptable for airborne designators, but limits the use of laser guided weapons for the infantry in the field. For small, light, man-portable weapons such as mortars and rocket propelled grenades the size, weight, and cost of the designator affects the deployment of a laser guided system. The fact that the designator is not eye-safe limits the use and deployment of laser systems in urban and mixed environments. This expansion of operational field use constitutes the primary motivation for a switch to an eye-safe wavelength.

FIG. 1 shows a block diagram view of a related or conventional laser tracking processor 100. A four-quadrant detector 110 receives laser illumination energy from a targeting source (not shown) distributed among receiver channels A, B, C and D with light detection diodes. The laser peak energy concentrates at a localized region within the detector 110 based on each channel, and the distribution provides course correction information for guidance control instructions.

The signals from the detector 110 are amplified by a preamplifier 120 and a video amplifier 125 to augment signal strength. These signals are tapped for each separate channel to a summation accumulator 130 to produce a combined signal that proceeds to a splitter 135. The signals also proceed to a sampler 140, each channel corresponding to an individual sample-hold register at a specified time. From the sampler 140, the values for each channel correspond to a record 145.

A code source 150 provides the separation interval between source pulses projected to the detector 110. A reference clock 155 synchronizes the interval to produce the selected pulse frequency. The pulses can be repeated at an interval based on the frequency, which can be established by a pre-set value or varied according to a pseudo-random basis.

A correlator 160 evaluates the combined signal at each sample event as the signals travel chronologically. For this purpose, the correlator 160 includes a shift register 162 having a series of taps 164 that feed to an AND gate (adder) 166. The accumulator 130 provides, via the splitter 135, the combined signal to the correlator 160 and to a phase-lock loop (PLL) 170 that generates a tracking interval window 180 within which to distinguish the received pulse signals from background noise.

The clock 155 synchronizes both the phase-lock loop 170 and the shift register 162. The phase-lock loop 170 receives both the summation signal via the splitter 135 as well as the correlated shift register signal from the adder 166. In response, the phase-lock loop 170 adjusts the sampler 140 so that the received pulse for each channel occurs within the window 180. In this manner, all pulses outside the window 180 are ignored as spurious.

The shift register 162 receives the combined signal in temporal series via the splitter 135 over a sampling interval. The taps 164 register signal strength at selected samples along the sampling interval that feed to the adder 166. In response to the AND gate signal exceeding an appropriate threshold, the received signal from the detector 110 corresponds to a reflection of the source pulse, thereby indicating target acquisition for tracking and/or fire-control purposes. The adder 166 provides a feedback signal to the phase-lock loop 170, which corrects the position of the combined signal at the splitter 135 so that the window 180 encapsulates the adder signal that exceeds the threshold. The sample values for course intercept correction can be stored at the record 145.

This conventional configuration 100 requires strong source signals for intended detection by a tracking receiver. Such signals can be detected by the target, which may take evasive action. Target response may include maneuvers to avoid interception and/or attacks against the illumination source and/or interference with the return reflection. To reduce such target opportunities, the illumination signal should preferably possess sufficiently low energy as to be difficult to distinguish from electromagnetic noise. This enables the laser source to use less power (with attendant reductions in weight), as well as attenuate ability by the target to detect the laser pulse.

Specifically, the pulse energy can be reduced in this manner by five orders of magnitude (i.e., a factor of about $10^5$). With conventional systems, the pulses are temporally separated by a frequency of between ten and twenty pulses-per-second. Existing range finders currently limit exemplary embodiments to about eight-thousand pulses-per-second, but in principle higher rates of pulse generation cannot be disregarded in subsequent applications. Micro-pulse illumination and detection presents an alternative pulse coding scheme for laser guidance to support improvements in the design of the designator and seeker yielding improved performance of both.

Figure 2:
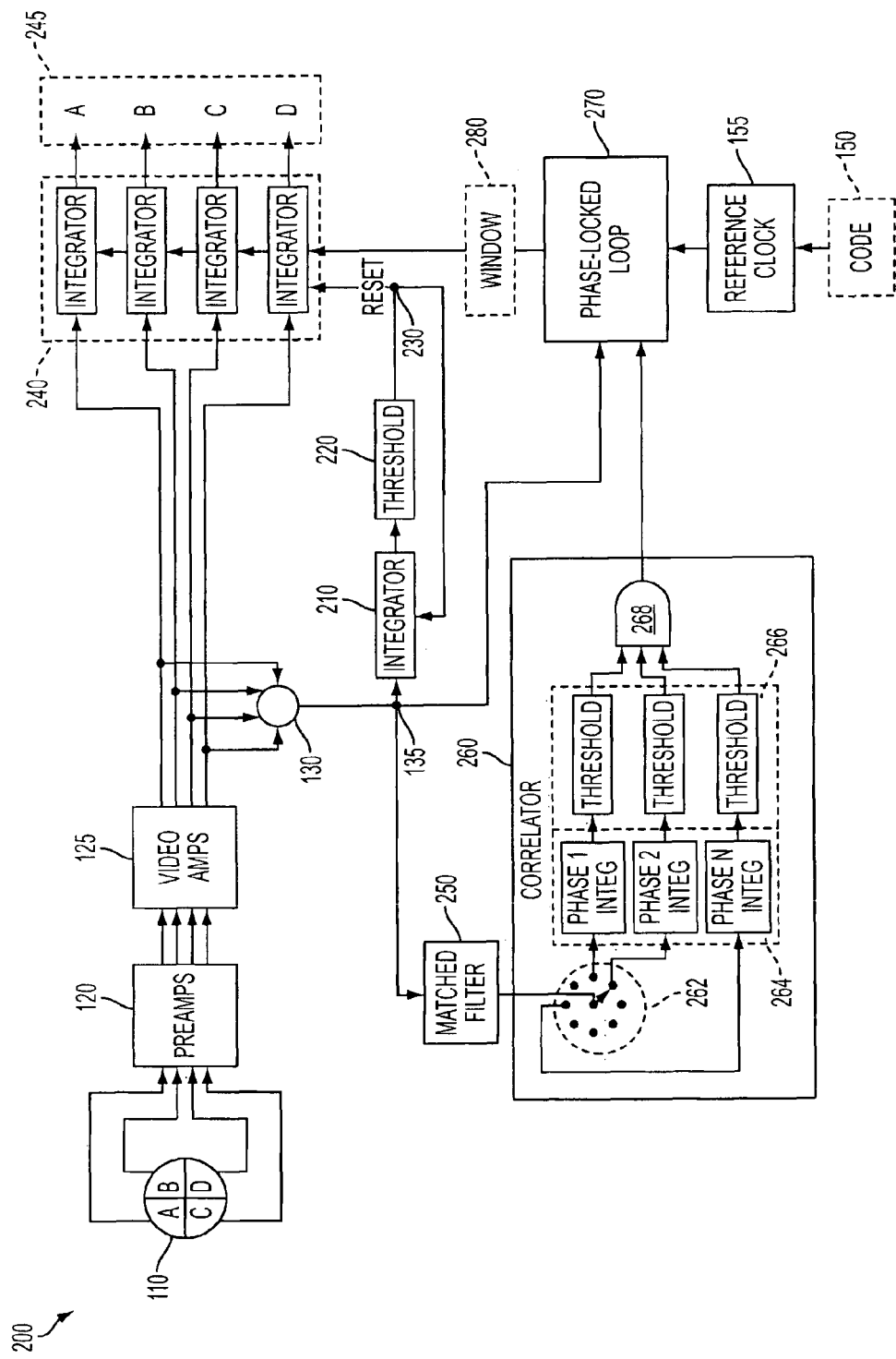
FIG. 2 is a block diagram view of a laser tracking processor according to exemplary embodiments.

FIG. 2 illustrates a block diagram view of a micropulse laser tracking processor 200 according to exemplary embodiments. The processor 200 includes the multi-channel optical detector 110 and amplifiers 120, 125. As distinct from conventional designs, the processor 200 includes an accumulation integrator 210, a threshold 220, a reset trigger 230, an integrator array 240 with record 145, a matched filter 250 and a correlator 260.

The correlator 260 includes a rotary switch 262, a phase integrator bank 264, a phase threshold bank 266 and an OR gate 268. The summation signal from the accumulator 130 via the splitter 135 and the OR gate 268 output both feed into a phase-lock loop 270. The reset trigger 230 restarts over for the next sequence of pulses to be integrated together. The phase-lock loop 270 provides a window 280 to adjust the interval for recording pulses via the integrator array 240.

The integrator array 240 includes channel integrators for each quadrant channel A, B, C and D. The accumulator 130 acquires amplified sample signals and collects these to be distributed from the splitter 135 to the matched filter 250, the sum integrator 210 and the phase-lock loop 270. The matched filter 250 isolates received signals within specified frequency ranges. The sum integrator 210 collects the combined signals, superpositioning pulse amplitudes until these are distinguishable from noise. The threshold 220 establishes the amplitude at which this distinction confidently satisfies guidance requirements using the signals distributed among the channels of the integrator array 240. The reset trigger 230 reinitializes both the sum integrator 210 and the integrator array 240 to begin another series of pulse accumulations.

The correlator 260 is designed to temporally locate the pulses for integration, in the process assigning the window 280 for the integrator array 240. The rotary switch 262 receives the filtered signal from the matched filter 250 and assigns the signal in convolution to one of a series of phases ranging from 1 to N. This switching can alternatively be implemented by other forms of sequencing. For non-regular intervals established by the code source 150, the phases may have non-uniformly temporal distribution. The sum of N samples proceeds as a "box-car" moving average over a time period T within which the pulses are distributed.

For each phase, the signals are integrated, i.e., amplitudes concatenated in the phase integrator bank 264 and compared to the corresponding threshold in the phase threshold bank 266. In response to at least one phase exceeding its threshold, the OR gate 268 provides input to the phase-lock loop 270 to indicate that the pulses are properly identified within the window 280. In an alternative configuration, the logic may compromise the necessity of a single phase with an appropriate subset that provides proper confidence that the proper laser designation pulses are indeed identified.

In this manner, the signal gain need not be adjusted. Moreover, sequencing by the switch 262 enables corner reflections to be overcome, as individual errors are discarded. Comparison of amplitude integration between pulse and noise is described subsequently. The advantage provided by exemplary embodiments for terminal guidance in context of the reset trigger 230 allows the sample number to decrease as the missile approaches the target with stronger reflected signal necessitating fewer integration pulses needed to exceed threshold than at farther distances.

The number of pulses that are integrated determines the signal-to-noise ratio and data rate of the guidance loop. For threshold comparison, as the number N of sampling pulses rises, Gaussian noise increases as $\sqrt{N}$ or $N^{1/2}$ (based on root-mean-square of random fluctuation) of N pulses. However, superimposed signals add linearly as N, so that the signal strength gains with each additional pulse to drive the higher number N of pulses being integrated. For N pulses, the signal amplitude has N times the signal level for a single pulse. By contrast, the noise root variance (standard deviation) grows with the square-root of N or $\sqrt{N}$. Thus, the signal-to-noise ratio (SNR) grows by a factor of $N \div \sqrt{N} = \sqrt{N}$ with increasing number N of pulses.

A data sample for the guidance loop becomes available only upon completion of the signal integration. For a basic pulse rate of 10 kHz with a thousand pulses being integrated, the guidance loop data rate becomes 10 Hz. By integrating more or fewer pulses, the data rate correspondingly increases or decreases. The number of pulses can be adjusted such that the signal-to-noise ratio remains constant, depending on signal strength. For this condition, the data rate increases as the missile closes on the target as described previously.

The line-of-sight angle and angle rate dynamics vary inversely with range to target. Consequently for these embodiments, the missile's guidance loop receives a higher data rate under the most efficacious conditions. This change in data rate occurs inherently between the designator and the seeker, and represents an automatic improvement without coordination between the two systems.

The variable pulse integration technique provides an additional option. For platforms that can support the weight and price of a higher power designator, the seeker would have a higher data rate and could be used against mobile, maneuverable targets. For stationary and non-maneuvering targets, a lower power (smaller, lighter, and cheaper) designator could be used, particularly by infantry. This means that soldiers and marines, who more than likely would be using simple weapons such as mortars against stationary targets, could do so with a lightweight, inexpensive designator.

Figure 3:
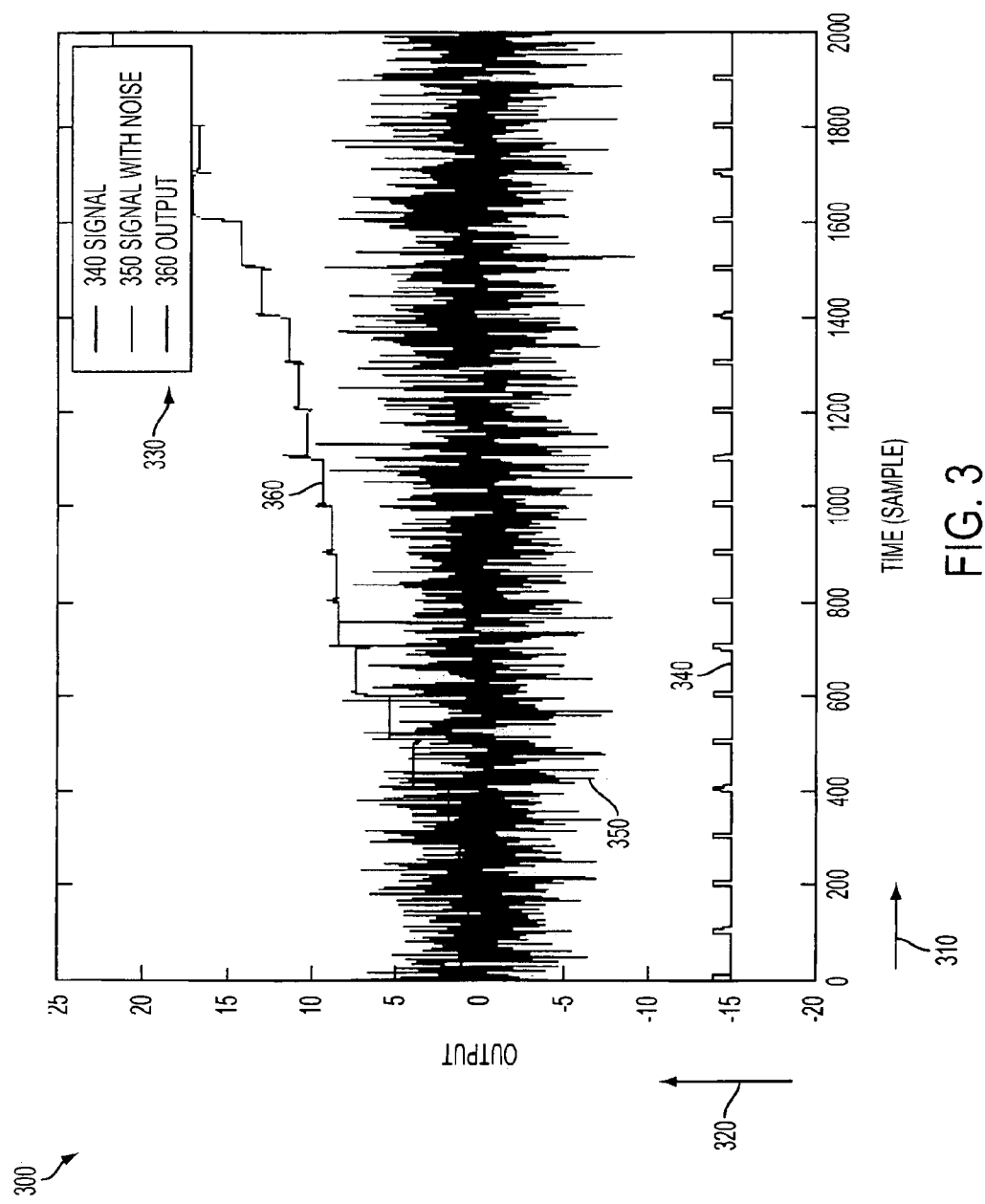
FIG. 3 is a first graphical view of signal amplitude over a continuing time period.

FIG. 3 shows a first graph 300 of signal amplitude over a continuing time period. The abscissa 310 indicates time for sampling in milliseconds. The ordinate 320 represents signal output in undefined units. The legend 330 identifies separate plot lines for the received pulse signal 340, sampling noise 350 (that includes the signal embedded 340), and integrated output 360. The signal 340 represents a pulse train much lower in amplitude than the noise. Thus, the sampling noise and embedded signal 350 are ordinarily indistinguishable from random high frequency oscillations. As accumulation of signal peaks gradually increases with increasing samples, the output 360 eventually becomes sufficient to be distinguishable above the sampling noise profile 350.

Figure 4:
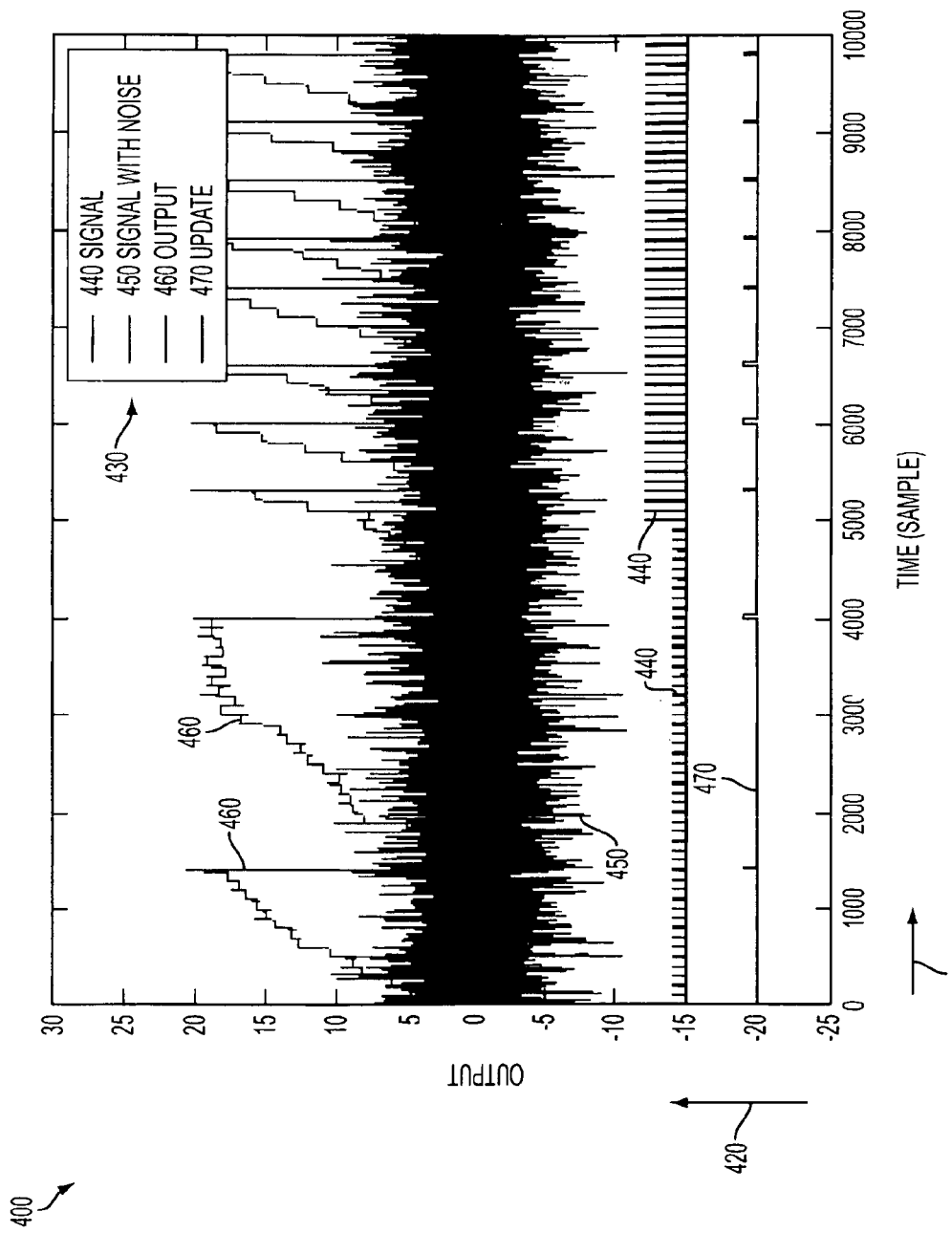
FIG. 4 is a second graphical view of signal amplitude with reset over a continuing time period.

FIG. 4 shows a second graph 400 of signal amplitude over a continuing time period. The abscissa 410 indicates time for sampling in milliseconds. The ordinate 420 represents signal output in undefined units. The legend 430 identifies separate lines for the received pulse signal 440, sampling noise 450 that includes the signal embedded 450, and integrated output 460. As the integrated output 460 reaches a threshold-amplitude of twenty, the reset trigger 230 instructs the processor 200 to update the guidance system inputs.

The update signal 470 shows spikes corresponding to these occurrences. For example, peaks in the update signal 470 can be observed at 1.4, 4.0, 5.3, 6.0, 6.7, 7.4, 7.9, 8.5, 9.1 and 9.8 seconds. The intervals between these update peaks generally decrease with time. Especially at 5.0 seconds, amplitude of the signal 440 indicates a step increase, with attendant reduction in update intervals. Thus for time values along the abscissa 410 before 5.0 seconds (at the lower pulse amplitudes), the intervals between resets average about 2.0 seconds, whereas after 5.0 seconds (at the higher pulse amplitudes), the reset intervals average about 0.5 second.

The approach to the target of the pulse source and receiver reduces the accumulation time necessary to integrate pulses sufficient to overcome the threshold 220. Electromagnetic field strength increases inversely with the square of the radius from the source, whether transmission or reflection. This radius corresponds to the distance between the pulse-reflecting target to pulse-receiving detector, so that fewer pulses need be integrated over less time per update to achieve detection. This time reduction facilitates more rapid response to permit terminal course-correction trajectory changes.

A further description is presented regarding guidance based on the detector response. An incoming laser pulse reflected from the targeting source (not shown) focuses on the four-quadrant detector 110 to shine a circular laser spot thereon. A lens system (also not shown) deliberately blurs the laser reflection region of intensity to widen dispersion among the four quadrants A (upper left), B (upper right), C (lower left) and D (lower right). Under conditions in which the source points to the target, the spot distribution applies equally on all four quadrants with the spot's center corresponding to the corner intersection of the quadrants. Otherwise, the laser spot does not deposit equally among all four quadrants and the spot's center deviates from the quadrant intersection.

The deviation from the source's line-of-sight to the target can be measured by two angles, an up/down pitch angle and a port/starboard yaw angle. These angles derive from the energy of the spot distributed among the four quadrants and can be approximated by $\Delta\updownarrow=\{(A+B)-(C+D)\}\div[A+B+C+D]$ and $\Delta\leftrightarrow=\{(A+C)-(B+D)\}\div[A+B+C+D]$, where $\Delta$ represents the angle corresponding to a control maneuver instruction, $\updownarrow$ represents up/down pitch deviation, $\leftrightarrow$ represents port/starboard yaw deviation, and channels A, B, C and D represent the received sample values of energy detected for each respective quadrant. Artisans of ordinary skill will recognize that a quadrant-divided receiver 110 is merely exemplary and that other plurality divisions can be employed for adequate course corrections without departing from the scope of the invention.

To derive the energy in the four quadrants, the laser pulses received by the detector 110 must be amplified and sampled at the correct time interval, i.e., within the window 180. The received pulses 340 as a pulse train are amplified by the pre-amplifier 120 and video amplifier 125. To sample the pulses at the correct time, the pulse train 340 must be detected within the noise 350 and tracked. The processing electronics 200 recognize the pulse train 340 in the presence of the noise pulses 350 mixed together. Also, there may be other extraneous pulse sources, such as a jammer or another valid pulse train at a different pulse interval for another projectile also illuminates the target. The correlator 260 may thereby "lock on" to the valid pulse train. The correlator 260 recognizes the pulse train 340 by superimposing the noisy pulse input 350 with a pulse train 340 at the valid pulse interval.

For the conventional processor 100, the shift register 162 performs this correlation. A signal is inserted into the shift register in digital form, registering as a "1" for a pulse and as a "0" for its absence. The shift resister 162 is clocked at some multiple of the pulse interval. Taps 164 obtain signals from the shift register 162, which correspond to pulses at the correct pulse interval. These taps 164 are logically added as shown by AND gate 166. At the correct pulse interval through the shift register 162, each of the four taps 164 registers "1" together concurrently, thereby indicating that the AND gate 166 has identified the sought interval.

The probability of noise pulses causing false identifications can be diminished by increasing the number of taps 164. Upon identifying the pulse train 340, a phase-lock loop 170 or similar mechanism can be used to track the pulse train. The phase-lock loop 170 creates a sampling clock to sample the pulse amplitudes at the proper time. In some systems, the correlator 160 and phase-lock loop 170 are performed in software using a micro-controller.

The micropulse processor 200 has many similar components as the conventional processor 100, but differs by the pulse amplitudes being below the noise floor of the amplifiers 120, 125. The pulse train amplitude is diminutive compared to the noise, completely obscuring the pulses 340 from detection over the noise profile 350. Integrating the pulse train 340 over the pulse interval (whether steady or shifting according to the code source 150), the integral output 360 of multiple pulses rises above the noise background 350. The phase-lock loop 270 controls the integration window 280 after the correlator 260 identifies the pulses 340 in the integrated pulse train 360.

In order to detect the pulse train buried in the sampling noise 350, the correlator 260 must integrate over several pulses, performing the same function as the A, B, C and D integrators 240 without the benefit of knowing the correct phase of the incoming pulse train. The correlator 260 must search for the correct phase and "lock on" to the pulse train. The matched filter 250 boosts the signal-to-noise ratio (SNR) before the signal goes into the correlator 260. The matched filter 250 for a rectangular pulse provides a shifting definite integral of the input over the pulse width T (i.e., the interval between pulses) over the last seconds of the pulse width, as expressed by:

$$S_{filter\_output}(t) = \int_{t-T}^{t} S_{filter\_input}(\tau) \cdot d\tau,$$

where S is the time-varying signal, t is the sampling time, $\tau$ is integration time and T is pulse width running interval. The integration interval boundaries extend from the sampling time minus the pulse width t−T until the sampling time t.

The correlator 260 computes the integrals of sequential pulses. These integrals are computed for all possible phases of the desired pulse train 340. This phase search process is illustrated in the diagram as a rotary switch 262 with outputs to the integrator bank 264. The rotary switch 262 rotates at the sample rate of the processor making one complete revolution in a pulse repetition interval (not the pulse width interval T). Each tap of the rotary switch 262 corresponds to a possible phase of the pulse train. The input signals are averaged over the last pulse width T and sequentially input to the corresponding integrator in the integrator bank 264 for that phase.

The rotary switch 262 then sequences to the next integrator for the next phase, and returns to the original integrator in a single pulse repetition interval, thereby adding again (superpositioning) to the integral for that phase. The first integrator to ramp up to its set threshold thus indicates a lock onto the pulse sequence as illustrated with the OR gate 268. The phase of the integrator in the integrator bank 264 that exceeds the threshold first indicates the phase of the incoming pulse waveform 340. This "lock-on" can then be used to synchronize the phase-lock loop 270.

The phase detector as provided by the OR gate 268 and synchronized by the phase-lock loop 270 cannot use the edges of the signal to track the incoming pulse because the pulse amplitude is below the noise floor. Consequently, a simple sequential type phase-lock loop cannot be used. The phase detector employs integration to detect the signal buried in the noise profile 350. A mixer-type of phase-lock loop with a long time constant filter can track a signal 340 buried in the noise 350. Some variation of this phase-lock loop (such as in software) may be used to implement the phase-lock loop function.

Upon tracking and integrating the signal, the number N of pulses integrated must be counted. The more pulses that are integrated, the larger the signal level increases the signal-to-noise ratio (SNR). The number of pulses to be integrated may be set from examination of the integral from the accumulator 130 (i.e., channel sum). In response to the signal level of sum channel integrator 210 exceeding an appropriate threshold 220, the integrator 210 and integrator array 240 are reset by the trigger 230. This sets the signal-to-noise ratio (SNR) because the noise level remains substantially consistent and the signal level of the accumulator 130 adjusts by the number N of integrated pulses. FIG. 4 shows the results from terminating the integrators at a fixed-sum signal level that reaches the threshold. In the first half of sampling interval (<5.0 seconds), the pulse signal amplitude 440 is low the signal accumulation 460 increases more slowly, thereby producing a low data rate. In the second half of the sampling interval (>5.0 sec), the signal amplitude 440 triples from that of the first half.

The signal accumulation 460 increases more rapidly producing a higher sample rate and thus shorter intervals between reset for course correction updates to the guidance system. Consequently, the data rate increases as the missile closes on the target while maintaining a constant signal-to-noise ratio throughout.

To summarize, micro-pulse laser guidance replaces a pulse train of high-power, low-rate pulses, with a micro-pulse train of much smaller amplitude pulses at a much higher data rate. The lower pulse amplitude necessitates integration by the seeker of multiple pulses such that the signal-to-noise ratio exceeds unity (at minimum). This superficially resembles GPS spread spectrum coding in which the "Big Bang" cosmic background radiation noise exceeds signal strength to avoid interference with radio astronomy. That code can sufficiently randomized so that the signal cannot be detected without prior knowledge of the proper interval sequence, rendering the signal covert for military purposes.

Switching to such a coding scheme for laser guidance provides the covert nature as with GPS. Reducing the delectability of the designator that illuminates the target by employing less power obviates the employment of countermeasures and evasive action by that target. This provides a clandestine advantage beyond that solely obtainable from frequency shifting. Additionally, spreading the energy temporally augments the eye-safe nature of the longer wavelength that would become more practical under these embodiments. Finally, such a coding scheme enables the missile seeker to employ a variable guidance loop data rate without changing the designator coding scheme.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A laser tracking processor for integrating measured target-reflection signals for directional control, said processor comprising:

an optical detector that receives the measured signals distributed among a plurality of guidance channels;

an accumulator that sums the measured signals as a combined signal for all said channels;

a correlator that temporally identifies event occurrence of a target-reflection pulse within said combined signal;

a phase-lock loop that synchronizes said event occurrence with a clock reference as a pulse window; and an integrator array that superimposes the measured signals within said pulse window for each said channel to produce channel-specific integrated pulse signals; and a sum integrator that superimposes a temporal sequence of combined signals from said accumulator as sum integration signals;

a noise comparator that determines whether said sum integrated signals exceed a noise threshold to set a detection satisfaction Condition; and a reset trigger that initializes said temporal sequence of said integrator array and said sum integrator in response to said detection satisfaction condition.

2. The processor according to claim 1, further comprising:

a matched filter that isolates received signals within specified frequency ranges for receipt into said correlator as a filtered signal.

3. The processor according to claim 2, wherein said matched filter provides a shifting definite integral of said combined signal, as expressed by: $S_{filter\_output}(t) \int_{-T} S_{filter\_input}(\tau) \cdot d\tau$, where S is a signal amplitude, t is a shifting sample time, $\tau$ is an integration time, and T is an interval between consecutive pulses.

4. The processor according to claim 2, wherein said comparator further comprises:

a phase selector that sequences a plurality of phases within said combined signal, each phase of said plurality of phases representing a finite temporal period;

a plurality of integrators corresponding respectively to said plurality of phases, such that each integrator superimposes said filtered signal within each respective phase as an integrated phase signal;

a plurality of thresholds corresponding respectively to said plurality of integrators, such that each threshold compares said integrated phase signal against a phase threshold to determine a phase satisfaction condition; and a logic gate that indicates a threshold-satisfying phase among said plurality of phases in response to at least one phase satisfaction condition.

5. The processor according to claim 1, wherein said comparator further comprises:

a phase selector that sequences a plurality of phases within said combined signal, each phase of said plurality of phases representing a finite temporal period;

a plurality of integrators corresponding respectively to said plurality of phases, such that each integrator superimposes said combined signal within each respective phase as an integrated phase signal;

a plurality of thresholds corresponding respectively to said plurality of integrators, such that each threshold compares said integrated phase signal against a phase threshold to determine a phase satisfaction condition; and a logic gate that indicates a threshold-satisfying phase among said plurality of phases in response to at least one phase satisfaction condition.

* * * * *